(12) United States Patent
Rao

(10) Patent No.: US 11,378,413 B1
(45) Date of Patent: Jul. 5, 2022

(54) AUGMENTED NAVIGATIONAL CONTROL FOR AUTONOMOUS VEHICLES

(71) Applicant: Sanjay K Rao, Palo Alto, CA (US)

(72) Inventor: Sanjay K Rao, Palo Alto, CA (US)

(73) Assignee: Accelerate Labs, LLC, Palo Alto, CA (US)

( * ) Notice: Subject to any disclaimer, the term of this patent is extended or adjusted under 35 U.S.C. 154(b) by 349 days.

(21) Appl. No.: 16/390,641

(22) Filed: Apr. 22, 2019

(51) Int. Cl.
| | |
|---|---|
| *G06T 19/00* | (2011.01) |
| *G01C 21/34* | (2006.01) |
| *G06V 20/20* | (2022.01) |
| *G01C 21/36* | (2006.01) |
| *H04W 4/021* | (2018.01) |
| *G01S 19/42* | (2010.01) |
| *G06N 3/08* | (2006.01) |
| *G06N 20/00* | (2019.01) |
| *G06T 17/05* | (2011.01) |
| *G05D 1/00* | (2006.01) |

(52) U.S. Cl.
CPC ..... *G01C 21/3688* (2013.01); *G01C 21/3438* (2013.01); *G01C 21/367* (2013.01); *G01S 19/42* (2013.01); *G06N 3/08* (2013.01); *G06N 20/00* (2019.01); *G06T 17/05* (2013.01); *G06T 19/003* (2013.01); *G06T 19/006* (2013.01); *G06V 20/20* (2022.01); *H04W 4/021* (2013.01); *G05D 1/0088* (2013.01)

(58) Field of Classification Search
None
See application file for complete search history.

(56) References Cited

U.S. PATENT DOCUMENTS

| | | | |
|---|---|---|---|
| 10,809,081 B1* | 10/2020 | Kentley-Klay | G01C 21/30 |
| 10,834,523 B1* | 11/2020 | Rao | G01S 7/4802 |
| 2013/0002416 A1* | 1/2013 | Gazit | B62D 15/0255 340/438 |
| 2018/0306930 A1* | 10/2018 | Laine | G01S 19/47 |
| 2019/0056729 A1* | 2/2019 | Ferguson | G06Q 10/00 |
| 2019/0065852 A1* | 2/2019 | Badalamenti | G06T 19/006 |
| 2019/0180485 A1* | 6/2019 | Kim | G01C 21/3602 |
| 2020/0160054 A1* | 5/2020 | Rogan | G06K 9/00744 |

OTHER PUBLICATIONS

Lowes, "Lowe's Vision: In-Store Navigation", Mar. 19, 2017, URL: https://www.youtube.com/watch?v=KAQ0y19uEYo&t=13s (Year: 2017).*

* cited by examiner

*Primary Examiner* — David H Chu

(57) ABSTRACT

An augmented navigational system is provided for autonomous vehicles. The augmented navigational system may further be coupled to an artificial intelligence system that provides object recognition and image recognition. A machine learning system may provide further feedback as to whether the pickup and drop off location was appropriate, and whether the recognition of one or more objects was appropriate.

20 Claims, 10 Drawing Sheets

Flow Diagram

Driver AR View on Mobile Application

Autonomous Vehicle Digital Windshield

Outside Windshield View

Wearable Glasses Augmented Navigation

AUGMENTED NAVIGATIONAL CONTROL FOR AUTONOMOUS VEHICLES

BACKGROUND

This disclosure relates to augmented navigational control and content for autonomous vehicles, moving vehicles, and mobile devices.

SUMMARY

It is an aspect of the present disclosure to provide enhanced vehicle control and navigation using overlays on a mobile device positioned with in a vehicle and/or on a display of an autonomous vehicle.

Augmented Navigation Control on Vehicles for User Interactions

In some variations, augmented reality (AR) and mixed reality (MR) experiences may be accessible in autonomous vehicles (AV) and/or mobile devices.

In some instances, a user interface such as a mobile application may be enabled with an augmented reality setting to allow for more effective driver and passenger identification, vehicle identification, and pickup and drop off zone identification.

In some instances, the mobile application for a driver may be enabled to provide overlays on a live view of the real-world environment to correctly identify pickup and drop off places, zones, and people and objects. These drop off zones may be based on geofenced areas which area available for viewing via an AR overlay in a live view obtained from a camera interface to a mobile device's camera.

Further, in some variations, using High Definition (HD) Maps, localization, and/or object identification and recognition, a driver or an autonomous vehicle may more accurately come to a stop at a more precise location or geofenced area even when GPS is not as accurate.

As an example, a mobile application or a server may recognize a particular building in one or more images as being associated with a pickup/drop-off location, estimate the distance between the vehicle and the building using a depth camera or other sensor, and provide instructions on a display of a mobile device or a vehicle to stop in a certain location, time or distance.

In some variations the mobile device may be in communication with the infotainment system of the vehicle via a wired or wireless connection. In some variations, the mobile device referred herein may include a display device integrated into the vehicle. In some instances, the augmented reality system may manage the hand-off between an autonomous mode and a driver mode. The AR overlays may indicate points of interest such as a store front for the handoff will occur, in how many seconds, and in how much distance in feet, miles, km, or another unit. In addition, an overlay may highlight on the roadway or on a pavement or other device, where the hand off should be started and completed for autonomous vehicle to human or from human to autonomous vehicle. As an example, the AR system may be enabled for hand-offs between driver and vehicle based on specific recognized safety zones.

A plurality of augmented reality interactive elements may be available in the application and/or vehicle including virtual cones, virtual pinpoints, overlay boxes around specific users, color coding of sidewalks, or substitution of signs.

In some variations, the augmented navigational reality system is enabled to provide a mixed reality experience with varying degrees of realism between the actual physical environment and an augmented reality environment. As an example, in certain instances, a minimal set of augmented reality elements may be added to the environment to add overlays to a largely live view of the environment.

In other instances, specific objects of the environment may be identified, recognized, removed, and/or replaced. In another instance, the entire environment including all objects and other elements may be replaced to show an augmented reality view that is all or nearly all a virtual reality view. An image processing system may be enabled to analyze a plurality of images including specific frames of a video sequence and/or one or more images. Differences between a specific set of frames may be identified. Using one or more AI models, aspects of the images may be separated including outlines of objects, and foreground and background elements. An AI based model may be used to extract contours of objects and a database of objects may be enabled to replace certain objects.

Mobile Device and Vehicle Display Interfaces

In some variations, the augmented navigational system described herein may be accessible via a plurality of interfaces including a vehicle interface, a mobile device display interface, or a wearable device lens such as a glasses device. For example, the AR system may be used on a mobile device attachable to and de-attachable from a windshield in a human driven vehicle (HDV), a smart glasses device, a wearable watch device, a display enabled electronic device in a vehicle, or a windshield or window of an vehicle such as an autonomous or semi-autonomous vehicle.

In some variations, the vehicle may be autonomous enabled and further enabled with a smart augmented reality display integrated into the autonomous vehicle or integrated into the windshield to provide for augmented reality experiences directly on existing vehicle surfaces. In other instances, a heads-up display may be provided in the vehicle. For example, the interfaces may be integrated into autonomous vehicles such as a display screen in the vehicle with augmented reality information for the pickup and drop off.

Wearable devices such as electronic glasses devices may further be used in the vehicle. One or more processors of the glasses may be enabled to executed one or more wearable applications including a transportation application or a driver assistance application. The wearable glasses device may further be enabled to provide directions, navigation, eye tracking, driver awareness, and routing information. The information may be displayed in one or more see thru lens in which ridesharing information is overlaid into the field of view of the person. Several notifications may be provided on one or more mobile or wearable device applications.

Sensing, Perception and Environment Understanding

Various sensors located in a mobile device or on an autonomous vehicle may be enabled to provide environment sensing and perception.

A mobile device itself may be enabled with a plurality of cameras including at least one depth camera for augmented reality experiences and environment sensing. In some instances, the vehicle may not be autonomous enabled but a mobile device placed within the vehicle can allow for an augmented reality (AR) experience.

In some variations, an autonomous or semiautonomous vehicle (AV) may itself include one or more sensors to capture the environment proximate and in the vicinity of the vehicle. The AV may include a plurality of cameras and radar positioned in the front sides roof back and other locations of the vehicle.

In some variations, a simultaneous location and mapping (SLAM) system may be used by the mobile device and/or an autonomous vehicle. In some variations, cameras are enabled to capture near and far objects, the color of objects, and store various digital versions locally. An AV may further be equipped with LIDAR, light detection and ranging, LADAR, RADAR, and IMU sensors. These sensors may include accelerometers, gyroscopes, barometers, temperature sensors, heat sensors and so forth. The LIDAR system may be enabled to create various 3D models and representations of objects. Various 3D models may be created for roads, cars, approaching vehicles, street signs, lane markings, sidewalks, storefronts, buildings and other moveable and fixed position devices.

In some instances, a locomotion system for an autonomous vehicle or a robotic moveable device may be managed by a server to appropriately position the autonomous vehicle or robotic moveable device to a location that is likely to be associated with user or package pickups or drop-offs.

High Definition Maps, Localization, Artificial Intelligence, and Machine Learning In some variations, High Definition (HD) Maps and localization systems may be used by the autonomous vehicle and/or the mobile application. The HD Maps may be downloaded to the mobile application or vehicle or be streamed from a remote server. The HD Maps may be localized to include micro measurement within a few millimeters, centimeters, or inches. The HD Maps may include lane markings, signs, objects, fixed position objects, moveable objects, and so forth. The HD Maps may further include contours of objects and ratings associated with the likelihood that the objects fit the contours of one or more known objects. In addition, the maps database may further contain information pertaining to a 3D location of an object in the physical world. The routing for a pickup may be based on the routing by known objects or locations in combination with GPS.

In some variations, a machine learning system may be enabled to capture the appropriate pickup and drop off locations. As an example, a plurality of pickups and drop offs may be recorded including the location based on GPS, GLONASS, or other location providing system. In other cases, the location may further be captured based on proximate objects. If a successful pickup or drop-off occurred, the mobile device of the passenger or the mobile device of the driver may include an indicator, icon such as a thumbs up or down, to capture whether the pickup or drop off occurred at the correct location. This data may be sent to the server and the platform may use the real training data to refine one or more models associated with the appropriate pickup and drop off location. The models may further include additional information such as how long each location took to complete the pick up and drop off.

The image recognition program associated with the augmented navigation platform may learn over time. Recognition may be performed in the cloud on one or more servers, at an edge device, an electronic device of the vehicle, or on the mobile device itself. One or more recognition algorithms may be built directly into an ASIC or other hardware device. The resolution of an image or a contour may be based on multiple inputs such as image outlines and photos. This resolution may be performed to various confidence levels based on the processing and network connectivity available to the mobile device. One or more convolutional neural networks may be used to process image and video data.

As an example, HD mapping data may be downloaded predictively based on location for example or object likely to be encountered and/or as the vehicle approaches a geofenced areas close to the pickup or drop off zone. An AI model may be enabled to optimized for real time processing and for varying levels of confidence based on whether the vehicle is in an autonomous mode or a human driven mode.

The mobile device is further enabled for 5G connectivity, 4G, LTE, LTE Advanced, 3G, 2G, WiFi, and other cellular and wireless services.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

Figure 1:
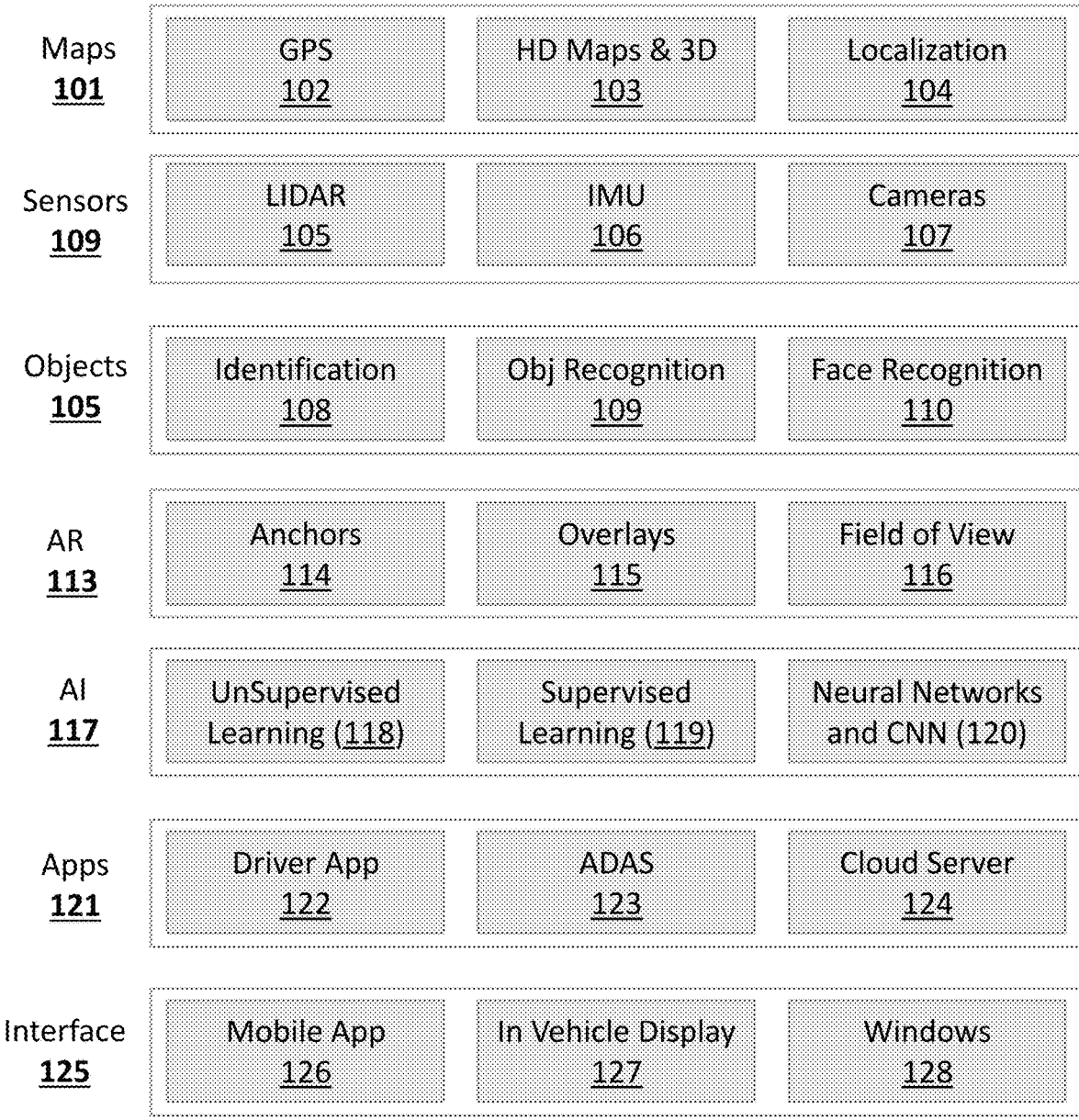
FIG. 1 depicts various modules and objects of the augmented reality system.

Referring to FIG. 1, FIG. 1 depicts various aspects of the augmented navigational and reality system that may be available for in one or more embodiments.

FIG. 1 shows various modules that may be implemented in software stored in a non-transitory computer readable medium executable by one or more processors of a network device, mobile device, vehicle, or a cloud-based server, a plurality of servers and other modules that may be implemented in specialized hardware.

The AR system is enabled to use a plurality of sensors to understand the environment in which a user and/or a vehicle is positioned. GPS 102, HD maps 103, and localization mapping data 104 may be combined with real time sensor acquisition 109 to understand an environmental context. The maps generated may include contour lines of various objects. 3D representations of various objects may further be created. Various sensors may be integrated into a mobile device, a network device for placement within a vehicle, or the vehicle itself. These sensors 109 may include LIDAR 105, Radar, IMU 106, a plurality of digital still and video cameras 107, heat sensors, pressure sensors, and temperature sensors.

Maps 101: In some variations of the present disclosure, HD maps 103 may be captured by one or more vehicles and mobile devices and available for use on one or more mobile devices. These HD maps 103 may include 3D representations of the environments including a plurality of combined measurements from image cameras, video cameras, digital still cameras, LIDAR, Inertial Measurement Unit (IMU) data, WiFi signals strength and SNR analysis, and cellular signal strength. GPS, GLONASS, GNSS, and other location systems may further be used including standard maps that have points of interest. Mapping data from sensors, LIDAR, GPS, WiFi signals may be fused together to provide rich hyper local HD mapping data.

As an example, a point of interest (POI) may be coupled to a GPS coordinates for a latitude and longitude. Further a geofenced area may be created for pickups and drop offs. The specific counters of objects of the Point of Interest may further be identified and stored in a network accessible database. Beyond this, various higher resolution aspects of environments may be created. Certain areas may be prioritized for recording information to generate high fidelity localized HD maps.

The prioritization scheme for these areas may be linked to POIs such as a pickup or drop off of a person or a package. The HD maps may have high fidelity resolution of objects and their distance from each other and position in a map. A server may store a listing of pickup and drop off requests including GPS locations and use the frequency of pickup and drop off to determine where to collect additional HD map related data. In some instances, the server may send only partial HD map data to a mobile device based on a pickup or drop-off location. As pickups and drop offs occur at one or more locations, the quality of the HD maps at these locations may be improved. The camera systems may be enabled to record data at these locations proactively. Data such as the time it takes to pickup a passenger and start or end a ride may be used to refine the appropriate physical positioning of the vehicle.

In some instances, various 2D images may be converted into 3D object representations based on interpolation, collaborative filtering, or a similarity analysis of an object data. As an example, if a camera captures an image of a mailbox, mailbox image may be recognized, and a 3D representation including details around height and spatial positioning may be obtained from an existing database that includes these 3D data for a prototypical mailbox. Data from a plurality of cameras of the vehicle are enabled to create a 3D representation of the various objects on the roadway. In some embodiments, radar, LIDAR, IMU data, are also enabled to generate 3D representations of various objects.

The sensing and perception platform may be enabled to detect various aspects of an environment to create rich HD maps. These aspects may include specific aspects of the road including lane markings, color, dashed and straight lines. Further, the curbs, sidewalks, and edges of roadways are further enabled to be detected. The HD Maps are enabled to provide fidelity of the positioning of various objects within a few centimeters. The HD map data may further include specific object information, identification, and profile characteristics about recognized objects.

As an example, a streetlight may be identified as an object of vertical height, classified as a street light, fixed position item, and be associated with a luminance pattern. A streetlight for a given city may also be learned and stored in a 3D object HD map database so that 2D images of streetlights can be appropriately mapped. The HD Map may further include identifying information including a fidelity to a centimeter level of the positioning of the object in the real world and relative to other objects and locations. HD Mapping information and pickup and drop off information may be crowdsourced from multiple drivers and vehicles and stored in a cloud based system. The cloud based system may be enabled to be shared across a plurality of drivers.

Various objects may be identified, recognized, and analyzed by an identification and recognition software program 105 executed by one or more processors within a vehicle, mobile device or network device. Various artificial intelligence (AI) and machine learning models for images may be implemented in software, stored in a non transitory computer readable medium, and executed by one or more processors.

Objects 105: It is aspect of the present disclosure to enable objects to be identified 108 and further objects to be recognized 109. The specific areas of recognition may be prioritized based on whether there is likely to exist a pickup up and/or drop off location and/or another point of interest. A neural network and a specialized image based network such as a convolutional neural network (CNN) may be used for image recognition.

Facial Recognition 110: It some aspects, users of a ridesharing and transportation service may provide one or more scans of their face and body to a mobile application. The mobile application may use one or more cameras to capture measurements of the user. These measurements may further include images acquired by a front facing camera, back facing camera, depth camera, infrared sensors, and other sensors. A facial recognition data API or a facial recognition system provided by the mobile device itself may be used. The data for this recognition may be stored in a separate encrypted format that is only accessible under certain permission schemas. Alternatively, a Face based API provided by one or more mobile devices may be used.

AR and Field of View: In some embodiments, a wider field of view 116 may be obtained by placing a plurality of mobile devices in a dashboard area and in synchronization with each other. Camera fusion from a plurality of cameras of a mobile device and/or a vehicle may be used to generate a wider field of view. These devices may further be enabled to allow a plurality of perspectives to be taken from each of the mobile devices. The devices may further be of different size. For example, in some instances, a first tablet computer with a large display may be placed on a mount in a dashboard area. To the left and to the right of this tablet device may be one or more mobile devices and/or other cameras. The images obtained from a plurality of image acquisition devices may be used to generate rich composite images.

The augmented reality system 113 may be executed by a cloud-based server, mobile device, or network device embedded in a vehicle. The AR system 113 may enable anchors 114, overlays 115, replacement of objects when viewed via a AR view. The customization may be based on the field of view 116 accessible on a mobile device, wearable glasses, display of a vehicle, or windshield.

An artificial intelligence (AI) system 117 may be enabled to learn various objects places and stops using a variety of modules. One or more neural networks may be enabled. The AI based system 117 may include supervised learning, unsupervised learning, convolutional neural networks, and other packages implemented in software to understand environments. For example, a pickup and drop off zone may be learned using supervised learning by allowing users such as drivers and passengers to state whether the location that they were picked up or dropped off from was appropriate. This indication such as a thumbs up on a driver application and/or a passenger application may then be linked to the GPS readings, HD Maps, images, time or other localization data to confirm whether a location was an appropriate pickup.

By employing a multi-modal set of factors including location, object recognition, facial recognition, anchors, and so forth pickup and drop off locations for passengers may be optimized. Within a zone, a user may be recognized by the vehicle and an augmented overlay may be placed in proximity to the person.

Based on the context and the system requests, an Augmented Reality module of a driver application or a vehicle mobile device or vehicle digital windshield may be enabled to provide a plurality of interactive augmented navigational reality elements on one or more interfaces to guide a user to a specific action or provide assistance 125. As an example, the augmented navigational reality system may be enabled to guide a driver or a vehicle to identify a passenger or object for pickup. In some embodiments, the augmented navigational reality system may provide a passenger, A/R overlays, indoor navigation and walkable maps to guide the user on where to proceed to meet a driver and/or a vehicle. Various overlays may be enabled in regions to provide virtual pickup and drop off zones.

Autonomous vehicle (AV) may in some instances be fully autonomous, semi-autonomous, or autonomous enabled based on a user configuration. In certain cases, the AV may be enabled to be human driven. The levels of autonomy of the vehicle or vehicles may be include levels between autonomy of L0 to L5. That is in some aspects, the vehicle may be human driven and in other aspects it may be autonomous.

In some embodiments, an autonomous vehicle (AV) may stop based on the camera and or sensor determining a minimum distance between the vehicle and the stopping place versus relying solely on GPS data.

In some embodiments, the autonomous vehicle may be enabled to display a virtual avatar in the position of the driver seat so as to provide a view of a person mimicking a driver. This avatar may be customized to the passenger of the vehicle or based on a user preferences.

In certain contexts and environments, the AV may be enabled to be driven solely using automation and in other environments the AV may need a human intervention. Under certain contexts, the AV may be enabled to steer to an appropriate augmented navigational reality defined zone. In other instances, the AV may be instructed by a processor to stop or brake upon reaching a location within a geofenced area.

In some instances, the vehicle may include a ridesharing vehicle, a car, a van, a truck, a flying car, drone, an electric or non-electric vertical take-off and landing device (VTOL), electric scooter, or another moving electronic capable device enabled to move people and/or objects. These devices may be self-driving enabled and vary between different levels of autonomous settings.

In some aspects, an advanced driver assistance system (ADAS) may be integrated into the vehicle and/or a mobile device application. The mobile device application may be stored in a non-transitory computer readable medium to be executed by one or more processors. This may enable an application driver assistance system. The mobile application may include a plurality of modules with the software that may be integrated into a variety of third-party ridesharing and autonomous vehicle pick up and drop off mobile applications. As an example, a ridesharing application may be enabled to use the AR application programming interface (APIS) from a plurality of software development kits.

In some embodiments, anchors may be dropped at a location 114. Previous pickups may be enabled with crowd-sourced anchors. The anchors may then be marked by subsequent drivers and passengers to create a feedback loop. This feedback look can further enabled a supervised learning experience 119. An AR anchor may be placed, for example, on a pickup or drop off zone. As an example, a house may have an AR anchor placed directly on the house. This AR anchor may be further animated to take an action as the vehicle is approaching.

Figure 2:
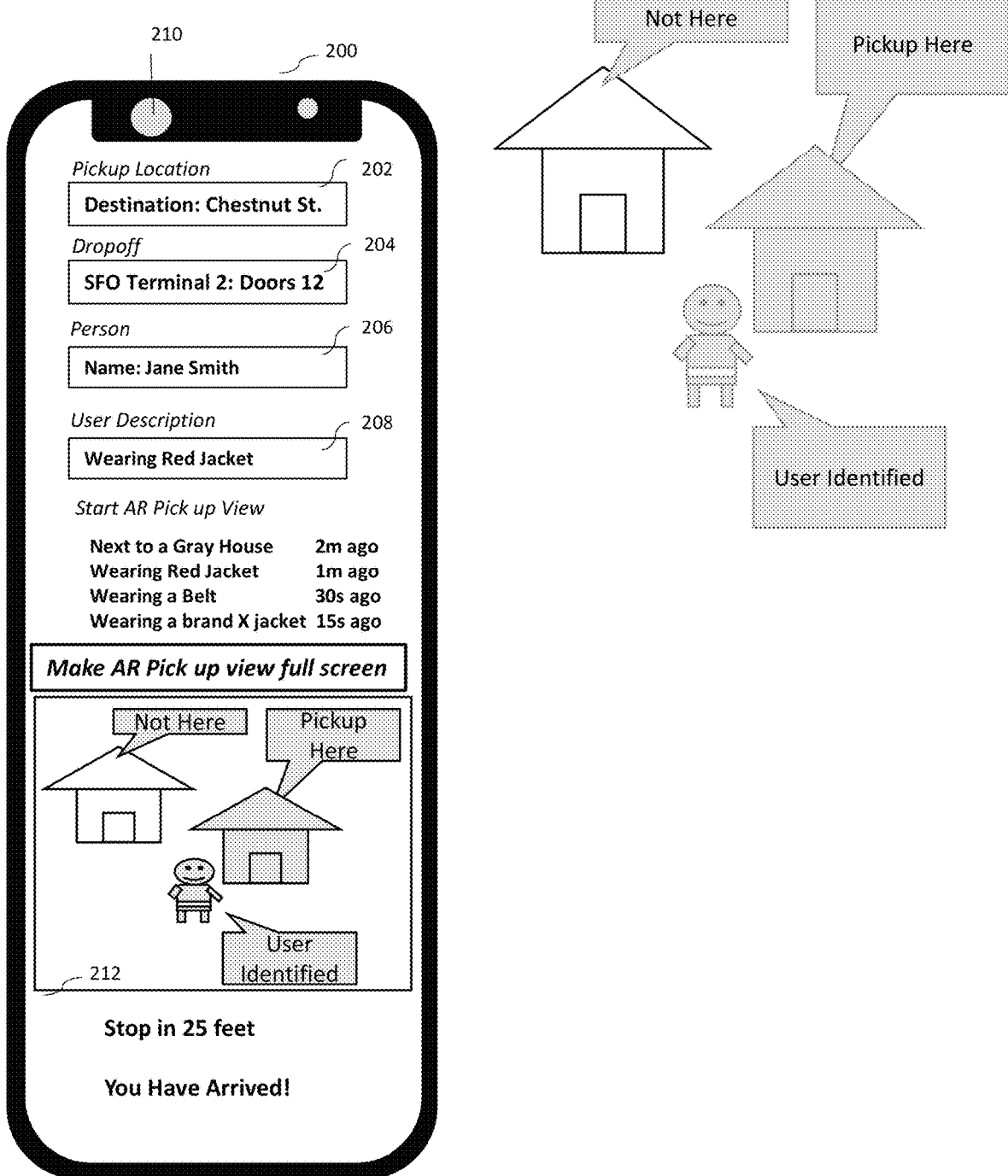
FIG. 2 depicts a mobile application from the perspective of a driver.

Referring now to FIG. 2, FIG. 2 depicts a mobile application for a driver. The mobile application includes a field that describes the pickup location 202, the drop off location 204, the passengers name 206, and a description of the passenger 208. The description of the user may be stored in a memory and include profile data such as current description as provided by a passenger via a passenger application or based on acquired data. On the mobile application 200 an augmented navigational reality view may be started in either full screen or partial screen. One or more cameras such as those depicted in the top block may capture one or more images. The cameras may include depth cameras. The cameras may capture a live view of real-world content. This content may be displayed in an AR window 212. The AR window may be made into full screen.

The mobile device 200 may be affixed to the windshield area or the dashboard area of the vehicle using one or more attachments. At least one camera 210 positioned on the backside of the mobile device is enabled to capture a real time video of the environment. A processor located within the mobile device is enabled to make the application display these images on the mobile device. A plurality of objects is enabled to be identified using one or more identification programs. These programs may use a neural network to more effectively identify and recognize objects. An AR module is enabled to place overlays on various objects as they appear. The overlays may be customized to the distance away from the object, overlays that direct the driver away from certain locations, and overlays that highlight the appropriate place for pickup or drop-off.

The recognition module may recognize objects in near real time and add contextual information on the mobile device. A server, the mobile device, and/or an edge computing device may be enabled with one or more AI based models to recognize the objects. As an example, a GPS recording may suggest that the driver stop the car in 25 feet at a particular house for a pickup. However, the depth camera may determine that the distance between the mobile device and the house which is recognized is greater than 25 feet. The driver AR app mode may recognize this distance and place an overlay on the house that is specific to drop off or pickup. In addition, it may update the estimate on the distance. That is, the navigation to the drop off point may be based on related objects versus actual distances.

The mobile device itself may be enabled to calculate its velocity and speed based on GPS coordinates, object identification or recognition, 3D object models, and/or combinations thereof.

In another variation, the mobile application may be integrated directly into a mobile device of a vehicle such as an autonomous vehicle. In certain embodiments, the windshield or one or more windows of the vehicle may be digitally enabled. In the autonomous vehicle scenario, one or more cameras of the vehicle may capture the environment, be sent to one or more processors of the vehicle, transmitted under some circumstances to a network server or processed locally, and placed on a display of the vehicle with one or more augmented navigational reality overlays or interactive elements.

Figure 3:
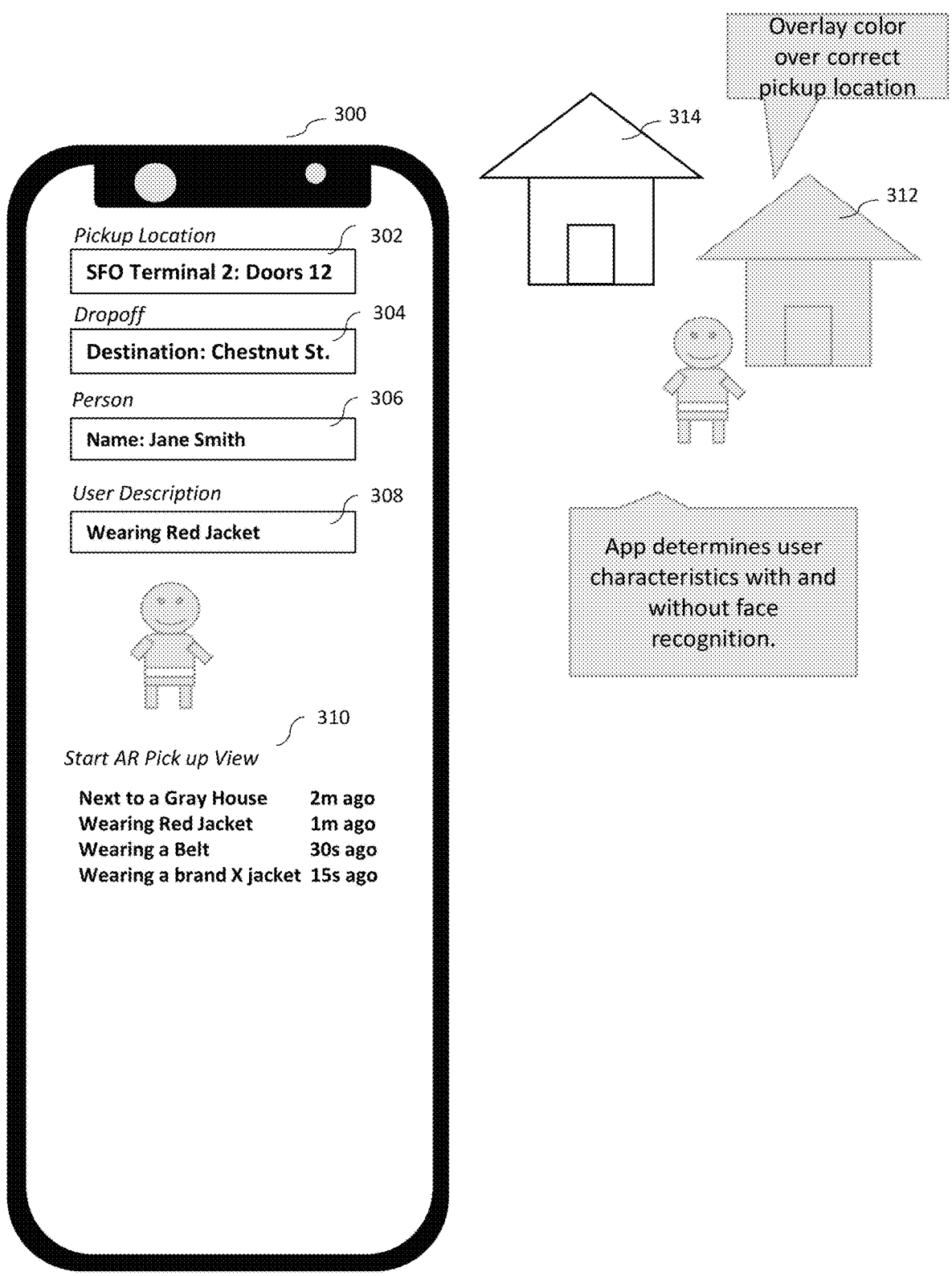
FIG. 3 depicts a mobile application that allows for configurable settings on user body and face recognition.

Referring now to FIG. 3, FIG. 3 depicts a driver focused transportation application, executed by a processor of a mobile device 300, that includes details of pickup location, drop-off location, person name, a user description and a people tracking system. The application may be downloaded from a server, stored in a non-transitory computer readable medium, and executed by a processor of a mobile device. The application is enabled to start an AR view that includes descriptions of a passenger or passengers for pick up. The passenger description may be enabled from a passenger application which enables a passenger to capture details including a picture and to capture a picture of what they look like at present. The passenger application is enabled to send via a wireless transmit and receive component one or more images over a network such as a Wi-Fi or cellular network, one or more current images. An image recognition and computer vision module executed by one or more processors of a cloud-based server is enabled to recognize aspects of the image and generate a description of the person with or without the person. A neural network may be used that is trained with clothes, object, and people data. As an example, the vision system may generate details 310 such as the person is wearing a red jacket, a certain brand clothing item, and is standing next to a gray colored house. An option under a privacy setting or another profile attribute may allow for users including both passengers and drivers to opt into the recognition program. The privacy data may further set to be deleted within a period of time such as 24 hours, 72 hours, a specific set of trips, or viewable only upon a similar driver or the same car being accessed or the same or similar route being taken.

In an autonomous vehicle, the mobile device display may be positioned in the vehicle, may be accessed by a mobile device in communication with the vehicle, or may be integrated into the vehicle itself. In this setting, various details may be presented on the outside of the vehicle, such as on a display screen affixed to the non-driver side of the vehicle to greet potential passengers. In other embodiments, the data may be presented on a display for instances in which a human driver is needed to intervene and take over from the autonomous vehicle. In other embodiments, the information may be displayed and require a human driver to take over for certain parts of the journey such as for a pickup and drop off. During these periods of transition, overlay information may be displayed in one or more live views with a plurality of overlay elements.

In some variations, an autonomous vehicle may be enabled to transition from self-driving to human driving based on overlaying augmented navigational content in the field of view pertaining to transition points.

In an autonomous vehicle mode, the digital display may be embedded directly into the windshield of the vehicle such that information appears within the field of the view of the driver and is enabled based on the user approaching a pickup or drop off zone or transitioning from human driven to autonomous driven or vice versa.

In some embodiments, where the display of the autonomous vehicle is digitally enabled, one or more cameras of the vehicle itself may be enabled to perform face recognition and provide overlays in the field of view of the user.

Figure 4:
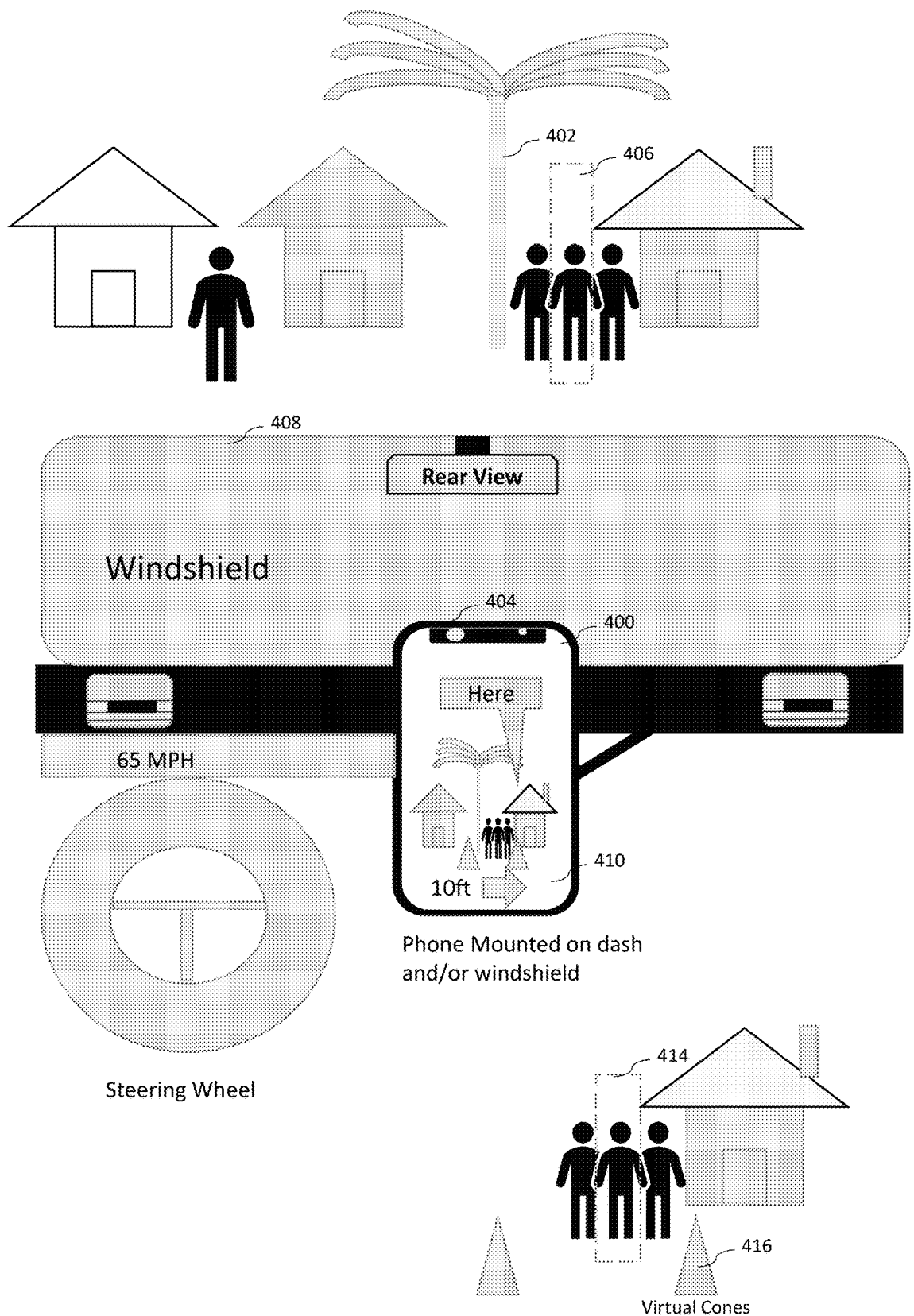
FIG. 4 depicts an AR view in a vehicle from showing a live view with a plurality of overlays on objects in the view.

Referring now to FIG. 4, FIG. 4 depicts a mobile device 400 mounted in a windshield 408 of a vehicle. The real world in front of the vehicle 402 includes various potential passengers to pick up including clusters of individuals. The mobile device is enabled to understand the environment and recognize objects to determine the appropriate position to stop the vehicle. In certain situations, such as in parking lots, apartment building lots, and other areas, the positioning associated with the location of a passenger and vehicle may not be accurate.

FIG. 4 depicts a real-world view 402 and an augmented navigational reality view 410 accessible via a mobile phone. The augmented navigational reality view may also be accessible on a digitally enabled windshield. One or more cameras 404 of the mobile device 400 is enabled to capture images and video of the environment ahead of the vehicle. These images may be displayed in a live view on the mobile device display. Various annotations and overlays 406, 412 may be enabled to be added to the images that are displayed including directions for the driver to follow. An outline may further be placed over a specific person 406 in the field of view of the driver via the mobile application or via a digital windshield or heads up display.

In some instances, the live view may be disabled and a virtual view of the environment around the vehicle may be alternatively enabled. As an example, a virtual representation of the people, houses, objects, cars may be displayed on the mobile device. One or more cameras of the car, infrared sensors, LIDAR devices, may be used to capture the environment and send it to a mobile device for further processing and rendering of the view.

In the embodiments, a mixed reality view may be enabled in which some objects are virtual and other aspects of the environment are realistic live views of the environment.

Various boxes 414 may be placed around items of interest such as a person that needs to be picked up. Virtual cones 416 may also be placed in the mobile device view to guide a user to a destination including in areas where lane markings may not be available for a driver to view. These virtual cones may include one or more configuration parameters to be enabled to have a certain feet away from one or more objects.

In some variations, the mobile device may be positioned at the front of an electric scooter so as to provide an augmented navigational reality driving view via the mobile device. This view may further include the virtual cones to appropriately identify where the scooter driver should position the scooter.

In some embodiments, a digital windshield may be enabled to display the information viewable via the mobile device. The digital windshield may be enabled to be made opaque, see thru, colored, or layered with overlays in the field of view of the driver. The digital windshield may create a full digital representation of the environment and display in near real time items from the environment.

In some embodiments, the digital windshield may overlay items within the field of view a driver while remaining see-thru for other aspects to provide a driver with a real view of the environment.

In some instances, the digital windshield may contain information on the outside side of the vehicle to notify passengers or people on the street as to actions associated with the autonomous vehicle. For example, the vehicle on the outside of the car may be enabled to display information pertaining to a pickup of a user.

Figure 5:
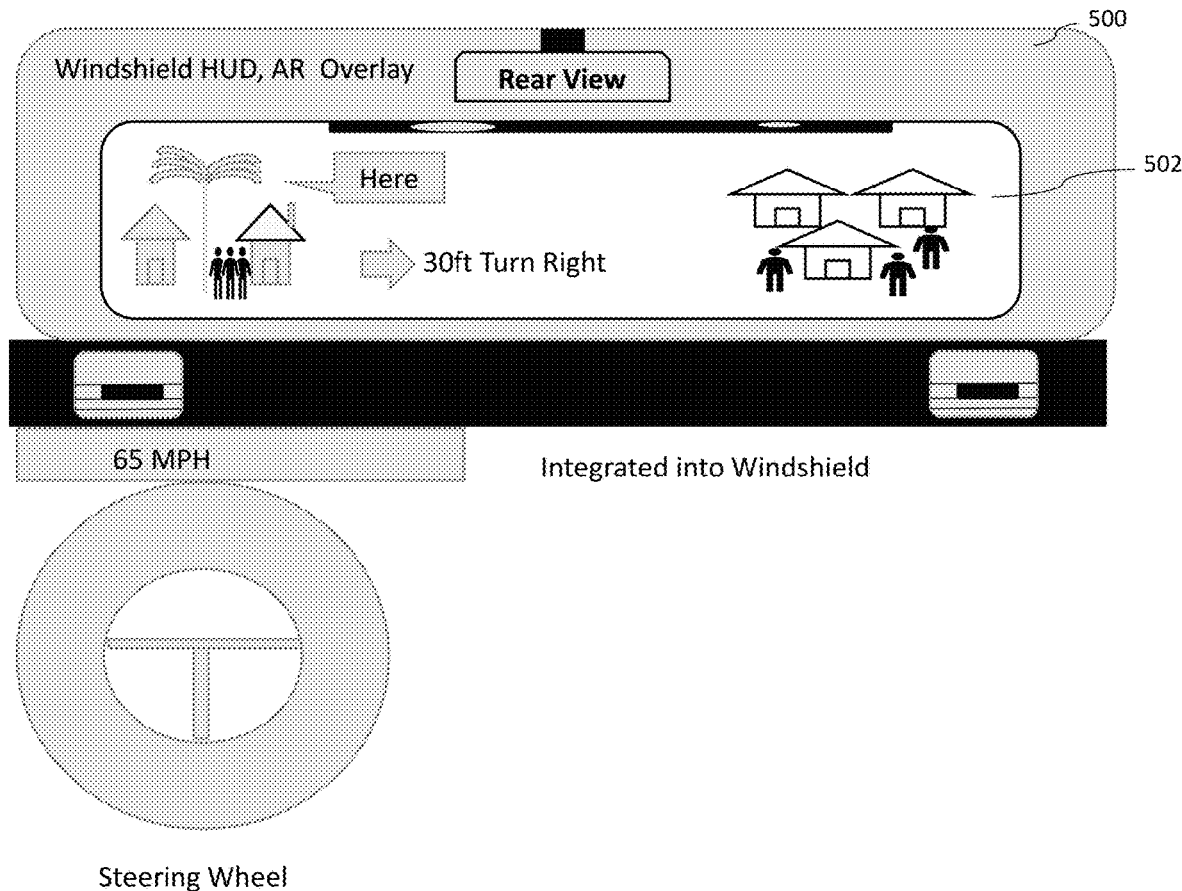
FIG. 5 depicts an AR view which includes navigation elements overlaid on the captured images.
Figure 5:
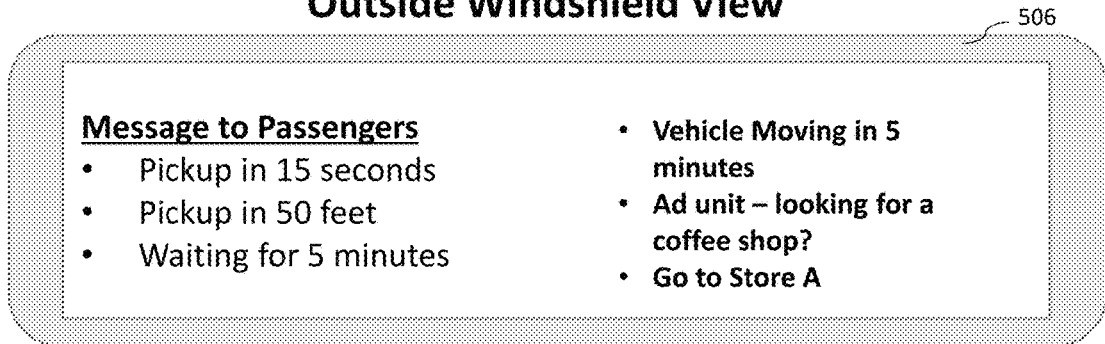

Referring now to FIG. 5, FIG. 5 depicts a windshield 500 that shows a virtual view 502 of the real-world environment 504. Various items may be projected into the field of view of the driver and or passengers on to the windshield. The windshield 500 itself may contain directions and overlays of the real environment in terms of how the vehicle and/or drivers should proceed. Some of these overlays may further include directions such as progressing in a certain direction or stopping in a certain number of feet. Other items within the field of view of the vehicle may be recognized such as a palm tree. The navigation system may reference dynamic point of interest items such as a large tree and route the vehicle based on points of interest. As an example, a navigation may include directions to drop off a person by a large palm tree or by a house with the a certain color door.

The mobile device, an edge computing device, or a network server is enabled to recognize various objects within the view of one or more cameras. The display may include a windshield that is A/R enabled or a heads-up display (HUD). This augmented navigational reality view may be enabled for the transition between autonomous and human driven conditions. The steering wheel 506 may rumble and increase its vibration as the transition occurs. Sensors in the steering wheel 506 may further capture whether the user is gripping the steering wheel 506 with one or both hands.

A plurality of messages may be displayed on the inside and the outside of the windshield, heads up display, or related device. The messages may indicate the point at which the transition from self-driving to human driven or from human driven to self-driving will occur. The messages may be in written text form including distance or time. In some instances, the transition may be coupled to a specific identified object. For example, the user may request or the vehicle may choose to transition the hand off between self-driving and human driving at an identified object such as a stop light, tree, house, building, parking lot, side ramp, or other location. The vehicle and the network server may contain a list of preferable objects to transition from self-driving to human driven or vice versa.

In other variations, several virtual ones may be placed in the view of the driver and a color-coded overlay may be placed on a region of the road to indicate the point at which the transition will start and the transition will end. The zone of when the transition ends may be dynamically extendable such as when the user is not gripping the steering wheel appropriately or if an internal facing camera with face, gaze, and/or eye tracking captures that the driver is not paying appropriate attention.

In some variations, information may be presented on the outside of the vehicle 506 on one or more windows, windshield, or displays affixed to the self-driving vehicle. The displays may include contextual information pertaining to the actions of a human driver or an autonomous vehicle. As an example, information such as when the vehicle is stopping, instructions for other people or cars to not take, or information associated with a passenger ready for pickup. These information messages may be created by a server based on navigational and ridesharing information associated with the pickup. Alternatively, this information may be based on the vehicle ADAS system. A set of written commands or instructions may store in a database and associated with one or more actions of the vehicle.

In some embodiments, the outside of the autonomous vehicle may display advertisements pertaining to one or more activities outside the vehicle. These messages may also be linked to geofence areas.

Figure 6:
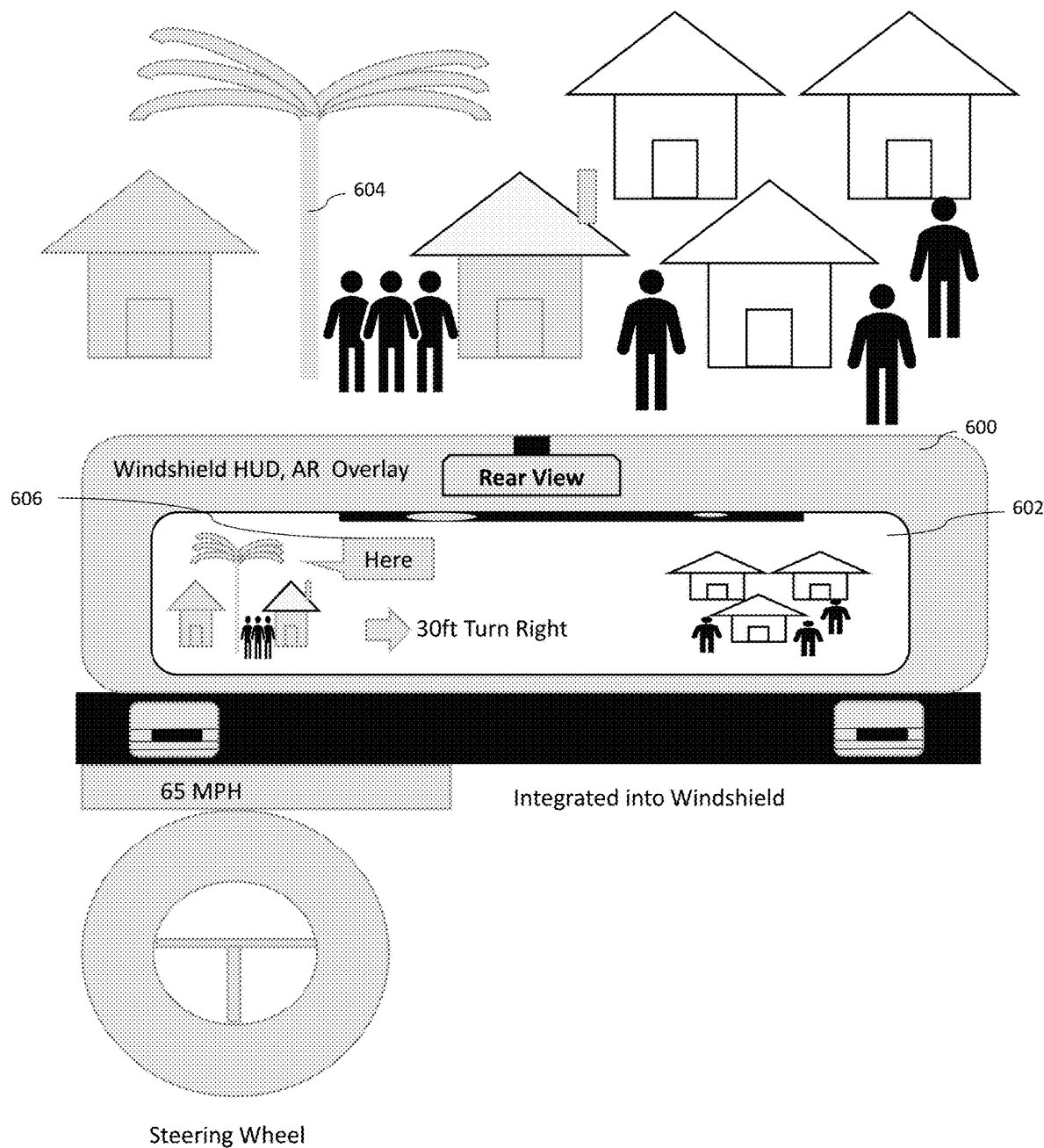
FIG. 6 depicts an AR navigation view integrated into a windshield.

Referring now to FIG. 6, FIG. 6 depicts a windshield of a vehicle 600 with a digital screen integrated into the windshield 602. The windshield 600 may make the digital screen transparent, or enabled with overlays, or fully opaque based on the level of autonomy that the vehicle is under. As an example, the digital screen 602 of the windshield may be configured to be see-thru or to display a live feed of the environment with a plurality of overlays marked on top of identified objects in the field of view of the driver when the vehicle is in a city or approaching a stopping point.

Various instructions may be presented to the driver such as navigational items 606. One or more cameras of the autonomous vehicle can capture real world content and display the content in the digital screen 602. Overlays, call-outs, color coding, and obfuscation may be placed over items in the digital screen 602. Various augmented navigational reality navigation and directions may be provided to the human driver. The navigational items may further include details regarding directions coupled to specific locations, such as turning left at a particular house, or making a U-turn at the cul-de-sac. In a scenario where a human driver is approaching a pickup of a passenger, the navigational components may be directed toward the pickup of the passenger. A facial or body recognition program may be executed to identify the user to be picked up.

The windshield or a mobile application positioned in the windshield may further display profile related data with respect to the passenger. The autonomous vehicle may further record various aspects of the pickup including video or digital still images to provide for an auditing system of the pickup.

Figure 7:
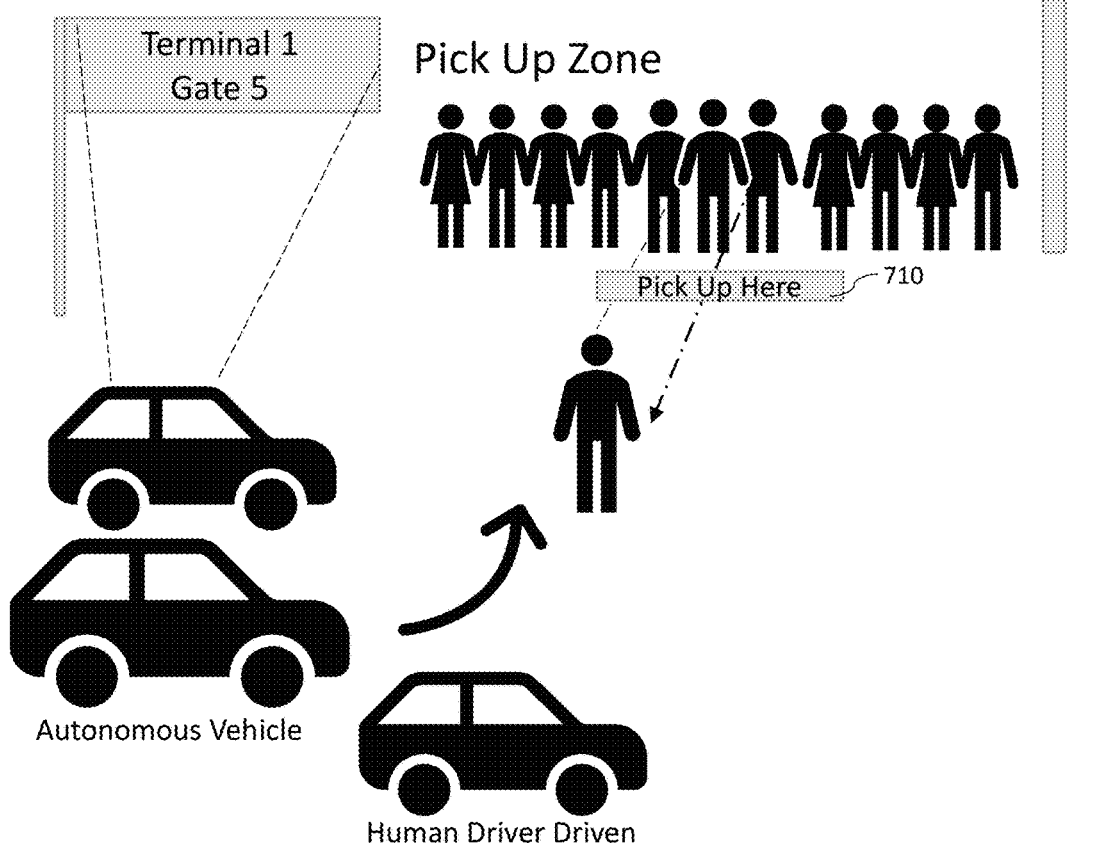
FIG. 7 depicts an AR view in a transportation application to assist a driver with pickup.
Figure 7:
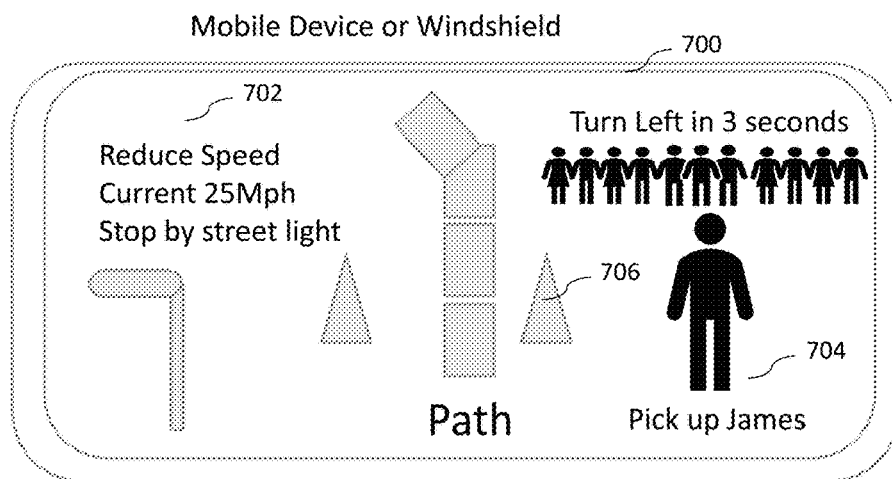

Referring now to FIG. 7, FIG. 7 depicts a mobile device displaying instructions on a ridesharing application 700 to a driver on how to appropriately proceed to meet a specific passenger or set of passengers. In some embodiments, the mobile device application or the vehicle may be enabled to distinguish between the passenger to be picked up and other passengers that are not needed to be picked up. For example, in crowded environments such as at airports, the density of passengers to be picked up may be very large. Under these environments the autonomous vehicle or a mobile device appropriately affixed in the windshield area may use one or more cameras to image the environment and passengers.

Beyond setting a GPS coordinate to drop off or pickup a person, HD maps and localization may be used to guide the driver or an autonomous vehicle to a more precise location that involves other dimensions than latitude and longitude. As an example, the driver application or AV may be instructed to proceed to stop at a specific lamp post on the left side of a roadway versus a right side. Alternatively, the imaging system of the mobile device or the vehicle may identify the person using an image recognition, body recognition, and/or facial recognition program. Correspondingly the driver application or AV may be instructed to proceed to a location separate from the initial target. Various instructions may be displayed such as navigation focused directions, speed related action items, indications of how many feet to stop, and an AR view which shows a specific object such as a person, house, lamp post, sign or other item and where to stop. This micro-level identification of locations allows a more efficient driver and vehicle to passenger process.

In certain embodiments, virtual cones 706 may be placed in the AR view for the driver. In some embodiments, the virtual cones 706 or guardrails are overlaid in the viewable area of the driver in the mobile application and/or on a windshield display. In some embodiments, the virtual cones 706 may be automatically placed in the viewable area only when certain objects such as a biker and/or a pedestrian is in proximity to the vehicle. For example, a camera may determine that a biker is next to the vehicle on the right-hand side. Upon the recognition that a biker is present, the virtual cones 706 may be placed in the field of view of the mobile device such a minimum separation distance is maintained. This minimum distance may be set to be one to two feet from the edge of the car to the identified biker. Upon the vehicle passing the biker the virtual cones may disappear. The virtual cones may further be virtual guardrails. A minimum separation distance is enabled to be calculated based on the type of object.

Certain objects such as a street lamp 708 may be recognized by a sensor such as a camera and/or LIDAR of the mobile device or vehicle. These objects may also be available in one or more HD maps. The driver may be instructed via the app to proceed to a recognizable object versus a specific GPS coordinate. Correspondingly, the passenger or requester may be requested to similarly proceed to that location. An HD map located in the cloud or partially downloaded to the mobile device or computer system of the vehicle may further contain various recognizable objects. The routing system of a server may correspondingly request a user to proceed to one of these recognizable points. The AR view of the mobile application 700 may include the instructions such as to stop by a street light 708.

The navigational items presented in the display may further include animated directions that are referenceable relative to objects. As an example, a camera may capture one or more images or video of an environment, identify various objects, and recognize these objects. The navigation instructions may then be referenceable relative to this recognized object such as a streetlight.

The AR view of the mobile application 700 may include directions that are relative to known objects. As an example, the directions may state that the driver should turn at specific locations, store fronts, buildings, and other recognized items. A street light for example may be given as an indication of where to turn. The mobile device application 700 may display a camera view of the streetlight and overlay contextual information such as the navigation items.

For a human driven vehicle, one or more displays such as of a mobile device may be enabled to display overlays such as a pickup zone 806 in the field of view of the driver or on a mobile application. The custom overlays may further be animated where the overlay of a person gets larger over time as the driver approaches a person for a pick up.

In some embodiments, an autonomous vehicle 804 may pick up a user. The autonomous vehicle may place various messages on the outside display of the autonomous vehicle including instructions to a passenger for pickup. These messages may be displayed on a outside display of the autonomous vehicle, on the windshield or window, or be projected onto the pavement. As an example, a projector of the autonomous vehicle may cast light and an image on the pavement in an area to indicate that a user should stand in that area.

The pickup zone or drop off zone for the autonomous vehicle may further be defined by one or more recognitions of objects in addition to a GPS recording. That is a 3D representation of an environment from an HD map may be accessed and used to orient the vehicle for the pickup.

Figure 8:
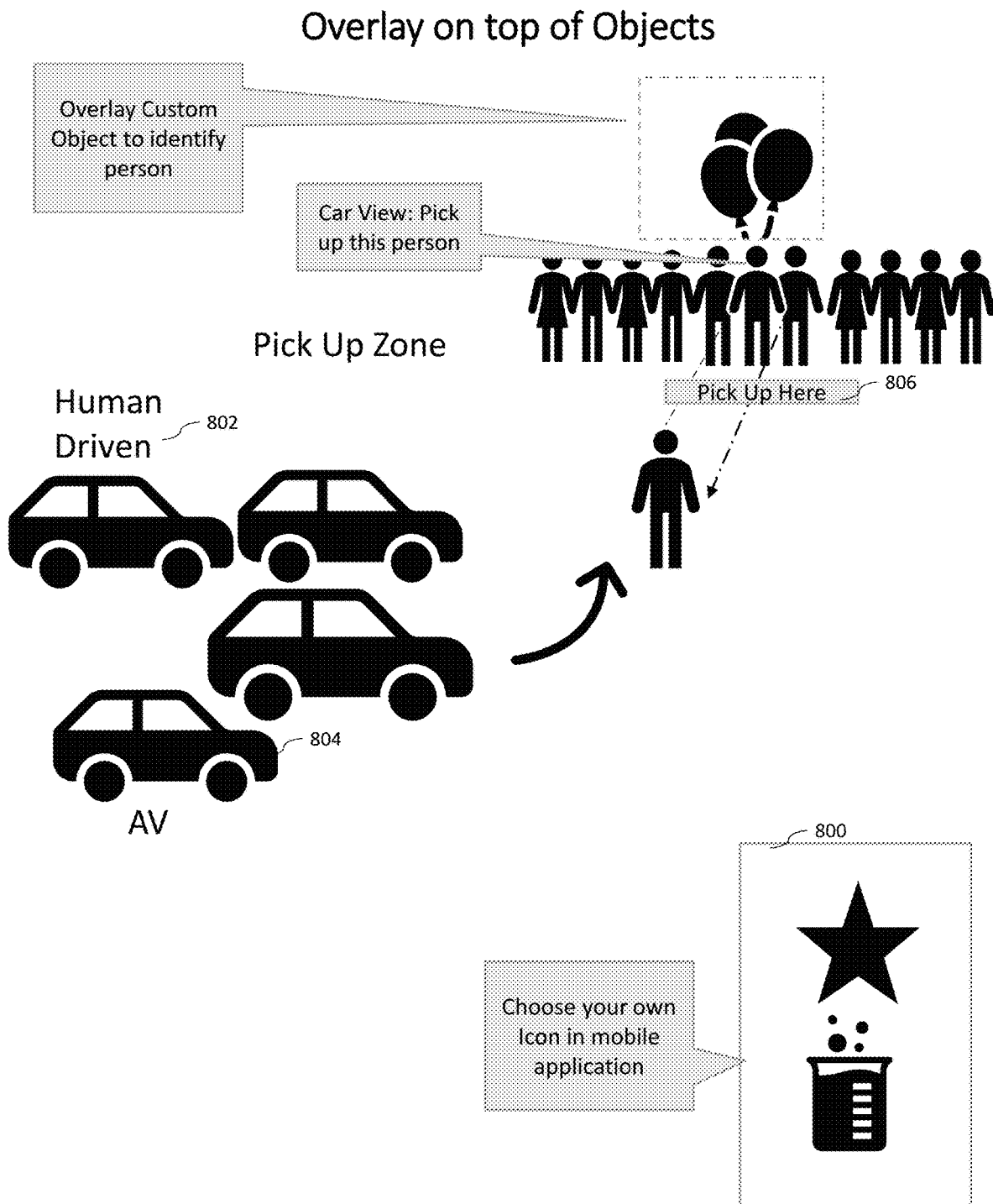
FIG. 8 depicts custom overlays enabled for passenger and driver augmented reality overlays.

Referring now to FIG. 8, FIG. 8 depicts various overlay icons or animations 800 that may be placed in the AR view accessible in the mobile device application and or windshield. Overlays may be customized by a driver or by a server or based on the user. As an example, a balloon may be placed over certain passengers such as the passenger that is intended to be picked up. In the AR view the custom overlays may be placed over the specific person for a pickup or a specific location or of an appropriate object. A plurality of vehicles including autonomous vehicles 802 and human driven vehicles 804 may be in proximity. These vehicles may be part of a fleet managed by a common ridesharing application or in coordination with a common ridesharing platform.

In a human driven instance, a mobile application for the driver is enabled to upon instructions from the ridesharing server to direct the human driven vehicle to proceed to a particular geofenced area. Based on how crowded the region is, the application may direct the driver to a different pickup point. On the mobile application a live view of the environment may be displayed including a real time view of the streets and a color coded geofenced area of where to stop may be highlighted. As an example, a rectangular region of 6 feet by 3 feet wide may be highlighted in the application 806. The mobile application may cause the mobile device to make one or more sounds when the vehicle is approaching the geofenced area 806.

In an autonomous vehicle scenario, the AV 804 is enabled to use one or more cameras of the vehicle, sensors, LIDAR, IMU, Radar, to gather information of the environment. Objects may be identified and in certain cases recognized to generate within a few centimeter relationships of the environment. Previous HD maps accessible within the vehicle or downloaded or streamed from a remote server may further be accessed. The vehicle may proceed to a particular location that is accessible for stopping which may be in proximity but not exactly associated with the original GPS coordinates. This may occur for example, if another vehicle or occlusion is in the way of the original place.

In this example, the vehicle may notify the ridesharing server, which in turn is enabled to send an update to the passenger or requester of the service with the location of the vehicle. In addition, to sharing the GPS of the vehicle, the sensor and environmental acquisition details of the vehicle itself may be provided to the mobile device. Alternatively, the server may provide details to the requesting passenger via the passenger application around the objects that are in proximity to the vehicle. This information for example may include next to a sign, stop light, street light, mailbox, tree, flowers, storefront and other items. In certain cases, when the objects are recognized the recognition data may further be provided on the mobile application of the passenger. The passenger may further be provided with the basic characteristics of the vehicle such as the make and model of the vehicle.

The various icons that are overlaid on top of passengers or points of interest such as where to stop may be customized by the user or by the specific location. For example, a pickup at a store may be tied to an overlay icon that includes a storefront whereas a pickup at a house may be coupled to an icon that has a home on it. A multi-passenger pickup may include an overlay that includes a family icon.

A passenger may further be enabled to request via a mobile application for a pickup of a human driven vehicle 802 or an autonomous vehicle 804. The various parameters that are associated with the vehicle may further also be a configurable selection available to the passenger.

Figure 9:
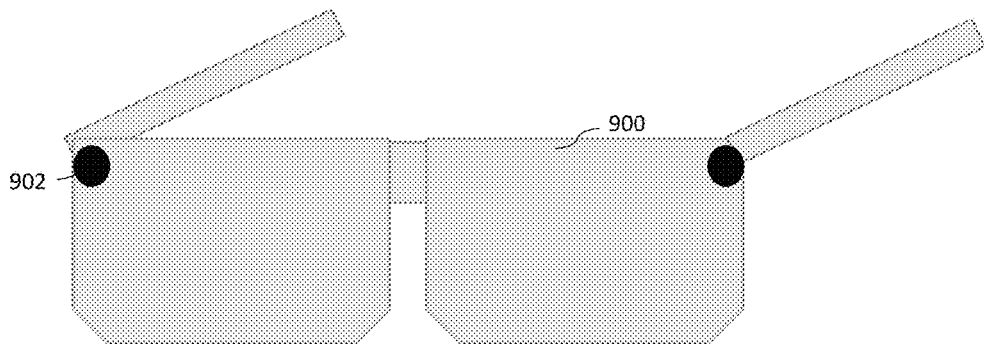
FIG. 9 depicts a wearable glasses device to assist with driving.
Figure 9:
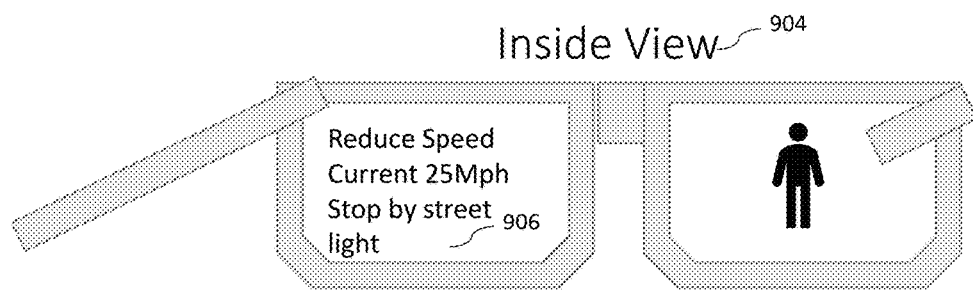
Figure 9:
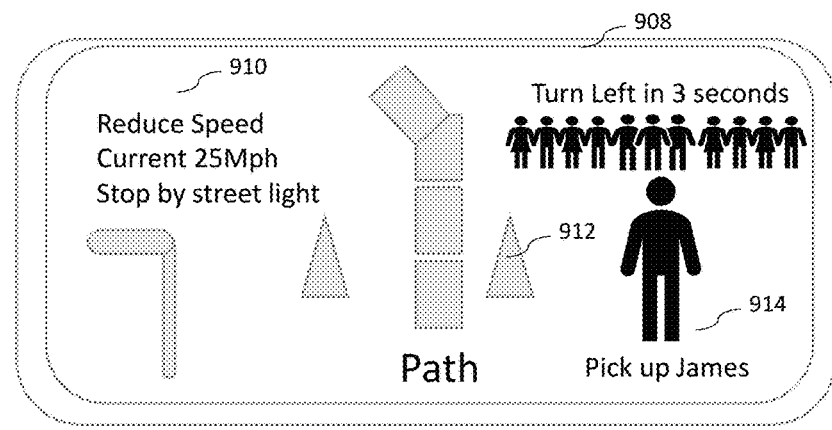

Referring now to FIG. 9, FIG. 9 depicts a wearable mobile device in the form factor of a wearable glasses electronic device 900. These glasses may be enabled with a processor, display, wireless transmit and modules, ambient light sensor, and/or one or more digital still and video cameras 902. The inside view 904 of the wearable glasses is enabled to display contextual information about the driving experience. This data may be obtained from a network server, a proximate mobile device, or an edge computing device.

A mobile application including a ridesharing application is enabled to be displayed and accessible on the wearable glasses 904 and 908. The wearable glasses device is enabled to display information to a driver including pickup and drop off information 906, distance to reach a destination, passenger information such as their profile picture, location information including HD maps related data, and points of interest.

In some embodiments, information pertaining to keeping the driver alert including eye tracking and gaze tracking software may be enabled. The glasses may further be enabled with a microphone to record conversations in the vehicle and to allow for cellular or wireless telephony. The glasses may in some embodiments further include a speaker to provide audio, music, voice calling communication.

Information such as navigation directions 910, virtual cones 912, and profile information regarding the pickup of the person 914 may be displayed in the inside face of the glasses. This information may be overlaid on real world content as viewable directly in the glasses or as captured by one or more cameras and displayed digitally in the lenses. Objects such as avatars, advertisements, or 3D video characters may be added to the augmented navigational reality view.

Figure 10:
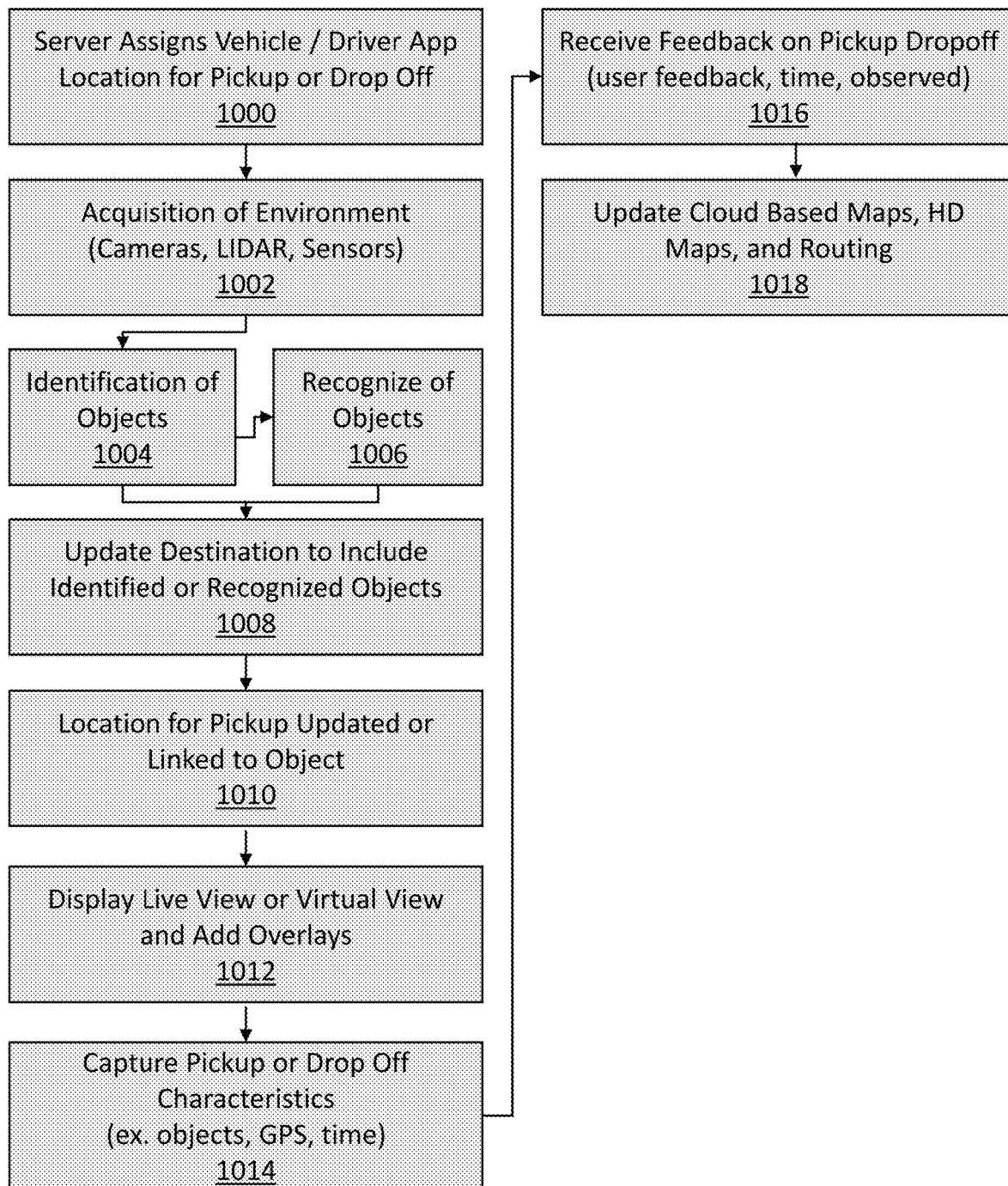
FIG. 10 depicts a flow diagram associated with autonomous pickups.

Referring now to FIG. 10, FIG. 10 depicts a flow diagram executed by one or more computing systems on a mobile device and/or a server. Upon a request to proceed to a specific pickup or drop off location 1000, the driver application or autonomous vehicle is enabled to proceed to a specification location as defined by one or more items such as a GPS or GLONASS coordinate, a 3D space, Wi-Fi, one or more points of interest, and objects. The environment may be continuously acquired 1002 using one or more sensors, cameras, LiDAR components, and other devices. Using one or more processors of a mobile device, vehicle, and/or a cloud based server the acquired data may be identified 1004 and recognized to find objects and understand the objects. A neural network may be used for the recognition.

The location of where the vehicle should proceed to may further updated based on one or more recognized objects 1008. The location may further include one or more points of interest or objects such as a streetlight, sign or mailbox. A live view may be presented for display on one or more interfaces such as the display of a mobile device or a windshield. Various objects may be assigned to the pickup or drop off location. As an example, a location such as a house may be added to the pickup or drop off location. A neural network may be used to recognize aspects of where to pickup such as a front door, a path to the house, a driveway or a mailbox. These items may be used to update the location to in proximity to a specific object.

The live view may capture the streets, roads, objects, lights and other aspects to be a a real time street or road view. Various objects may be added to the live view including one or more overlays, anchors, AR pins, and other objects that can be placed in proximity to one or more objects and viewable in an augmented live view. The overlays may include text, graphics, video, emoticons, animations, colors, and other descriptive items. The overlays may further be linked to regions and highlighted in the live view such that the driver or autonomous vehicle is instructed to stop anywhere that is safe within that geofenced region.

Upon reaching a pickup or drop-off location, the acquired data associated with that location is enabled to be captured and learned 1014. As an example, a camera may capture one or more images of a house including a front door. This data may be associated with the GPS location and a user profile to generate a rich location data for a particular place. The specific objects may be imaged and scanned by LIDAR and RADAR to determine spatial positioning of various items. The location of the person standing when the vehicle approaches may further be captured by the mobile device or autonomous vehicle. The distance that the person walks from where the vehicle stopped is further enabled to be captured. Other environmental parameters such as the wind, weather, sunlight, radiance, and time of day may further be captured in a complete profile of a pickup and drop off event.

Still referring to FIG. 10, feedback may be collected on whether the pickup or drop off experience was correct. This feedback may be used as part of a supervised learning system to enable pickup and drop offs to be completed more effectively. As an example, a thumbs up indication from a user and/or a driver may be effective in determining whether the pickup or drop off was correct. In some embodiments, the closed feedback loop data may not be available. In these situations, other data such as the time it took for the pickup to occur after the vehicle came to a stop and adjusted to characteristics of the passenger, number of passengers, environmental parameters may be used as a proxy for whether the location that the vehicle stopped was correct. For example, if on average the person being picked up takes 3 minutes for the trip to start, but at the last location the trip started after 5 minutes, and the person was in proximity to the vehicle as determined by GPS readings from both the vehicle or driver application and the passenger application, a low confidence score may be assigned to the pickup location. Alternatively, if the pickup happened with a lower amount of time or within the average time, then the confidence score with the location of where the vehicle stopped may be rated more highly.

The location associated with pickup and drop-offs may include a plurality of characteristics such as Wi-Fi SSID available, signal strength of Wi-Fi SSIDs, GPS, GLONASS, LIDAR, contours of environments, images of objects, recognized objects such as front doors, mailboxes, and address labels. This localization and HD map data may be sent back from both the driver application and or vehicle to a cloud server and also from a passenger mobile device application to update the HD mapping data, localization data, and inform future routes 1008.

In some embodiments, the processing and transfer of a live feed of images from a mobile device to a network server may involve a high amount of data and/or processing. The live mode for the driver may be started only upon the vehicle approaching a specified pickup or drop off zone.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A method comprising:
   capturing, by one or more cameras of an autonomous vehicle, a live view comprised of one or more images acquired in real time or near real time by at least one camera;
   identifying one or more objects based at least in part on an artificial intelligence enabled module, within the live view as associated with a location;
   wherein identifying the one or more objects in the one or more images is performed by correlating an aspect in the one or more images with at least one stored object associated with the location;
   wherein the identifying the one or more objects is performed upon the autonomous vehicle being located in a geographic area proximate to the location; and
   generating an augmented navigational view comprised of overlaying information pertaining to the one or more identified objects and the location on the live view.

2. The method of claim 1, wherein the augmented navigational view is generated only upon the autonomous vehicle being within a vicinity of the pickup or drop off location.

3. The method of claim 2, comprising:
   wherein a contour and/or image online of one of the one or more images is utilized to recognize an object and generate a refined location.

4. The method of claim 3, wherein the associated historical object is a house, a driveway, or a front door corresponding to the location.

5. The method of claim 2, wherein the augmented navigational view is updated to overlay in the field of view of a driver, contextual information related to the profile of a user for pickup.

6. The method of claim 1, comprising:
   providing an overlay on a pavement as to a stopping zone in the location; and placing one or more virtual cones within the augmented navigational view.

7. The method of claim 1, comprising:
   providing an overlay on a pavement as to a stopping zone, wherein the stopping zone is based on an area in proximity to a destination point as placed in a navigation module of the application; and wherein the stopping zone is determined by a match by the application between the one or more images and a high definition (HD) map.

8. The method of claim 1, comprising:
   providing an interface to a passenger mobile device application and placing a visual indication of an appropriate pickup and drop off location in the passenger mobile device application.

9. The method of claim 1, comprising:
   providing directional instructions on the augmented navigational view upon the autonomous vehicle being positioned in relative proximity to the location.

10. The method of claim 1, comprising:
    transmitting a localization related mapping data comprised of the one or more images and one or more sensor outlines to a server.

11. The method of claim 1, comprising:
    providing the augmented navigational view to overlay contextual information during a transition of the moving vehicle from an autonomous mode to a human driven mode.

12. A system comprising:
    a mobile device application stored in a non-transitory computer readable medium, said mobile device application enabled to acquire a live view comprised of one or more images acquired in real time or near real time by at least one camera utilized by the mobile device application;
    a module configured to identify an object within the one or more images as associated with a location;
    wherein the one or more images are captured by the mobile device application to further create a refined location of the mobile device application based on (1) a GPS reading and (2) an object in the one or more images correlated with an associated previously known object; and
    the mobile device application configured to display an augmented navigational view based on the refined location and comprised of overlaying information pertaining to the location.

13. The system of claim 12, wherein the augmented navigational view is generated only upon the mobile device application being within a vicinity of the location.

14. The system of claim 12, wherein a contour and/or image online of one of the one or more images is utilized to recognize an object and generate the refined location.

15. The system of claim 14, wherein the recognized object is a house, a driveway, or a front door corresponding to the location.

16. The system of claim 12, wherein the augmented navigational view is updated to overlay in the field of view of a driver, contextual information related to the profile of a user for pickup.

17. The system of claim 12, wherein the augmented navigational view further comprises of an overlay on a pavement as to a stopping zone in the location; and one or more virtual cones within the augmented navigational view.

18. The system of claim 12, wherein a digital window of the vehicle is enabled to overlay contextual information during a transition of the vehicle from a human driven mode to an autonomous mode.

19. The system of claim 12, wherein the augmented navigational view utilizes a maps system and the contours of one or more objects to determine the likelihood that that an aspect in one of the one or more images fits the contours of a known object.

20. The system of claim 19, wherein the maps system includes information pertaining to a 3D location of object in the physical world.

* * * * *